(12) United States Patent
Kobayashi (10) Patent No.: US 6,431,982 B2
(45) Date of Patent: *Aug. 13, 2002

(54) VIDEO GAME SYSTEM USING RADAR PICTURE

(75) Inventor: Yukihiro Kobayashi, Sapporo (JP)

(73) Assignee: Konami Co., Ltd., Hyogo-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,552

(22) Filed: Oct. 21, 1998

(30) Foreign Application Priority Data

Oct. 24, 1997 (JP) .............................. 9-292684

(51) Int. Cl.$^7$ .......................... A63F 13/00; A63F 9/24; G06F 17/00; G06F 19/00

(52) U.S. Cl. ................... 463/4; 463/1; 463/2; 463/7; 463/30; 463/31; 463/32; 463/33; 273/108.1; 273/118 R; 273/247; 273/317.5; 345/121; 345/123; 345/126; 345/129; 345/130; 345/131; 345/139; 345/522

(58) Field of Search ............................. 463/4, 1, 3, 7, 463/36, 29, 30, 37, 31, 33, 2, 32; 273/108.4, 118 R, 247, 317.5; 365/121, 126, 129, 130, 131, 139, 522, 123; 348/451, 452; 434/2

(56) References Cited

U.S. PATENT DOCUMENTS

| | | | |
|---|---|---|---|
| 3,874,669 A | * 4/1975 | Ariano et al. ............. 273/85 R |
| 4,672,541 A | 6/1987 | Bromley et al. |
| 5,356,156 A | * 10/1994 | Suzuki et al. ........... 273/437 X |
| 5,601,487 A | * 2/1997 | Oshima et al. ............. 463/4 X |
| 5,634,850 A | * 6/1997 | Kitahara et al. ......... 463/33 X |
| 5,649,861 A | * 7/1997 | Okano et al. ............. 463/30 X |
| 5,779,548 A | * 7/1998 | Asai et al. ................ 463/31 X |

(List continued on next page.)

FOREIGN PATENT DOCUMENTS

| | | |
|---|---|---|
| EP | 0830879 | 3/1988 |
| JP | 06-091054 | 4/1994 |
| JP | 06-165876 | 6/1994 |
| JP | 11-146979 | 6/1999 |

OTHER PUBLICATIONS

AYSO Soccer '97, Publisher:Game Tek, Developer: Rage Software Plc, Release:Mar. 31, 1997. (Source: www.zdnet.com/gamespot).*

JP-6-165876, translation copy, date of publication: Jun. 14, 1994.*

(List continued on next page.)

Primary Examiner—Joe H. Cheng
Assistant Examiner—Binh-An D. Nguyen
(74) Attorney, Agent, or Firm—Jordan and Hamburg LLP (57) ABSTRACT

Using a game system, an operator performs a virtual play in which soccer player characters on a virtual field are divided into two teams that compete to handle a ball and to carry the ball into a rival-team goal. The system includes game progress control unit for repeatedly obtaining instructions inputted by the operator and for sequentially changing a game playing situation of the player characters by repeating calculation necessary for specifying the game playing situation based on the instructions; and display control unit for displaying, based on a calculated result by the game progress control unit, a play picture representing the game playing situation within a restricted area centered on a position of the ball in the field and a radar picture representing positions of the player characters in a range of the field wider than a range represented by the play picture in a manner reduced by a scale-down rate. The display control unit includes a unit for changing the range represented by the radar picture and the scale-down rate of the radar picture on the basis of the game playing situation.

34 Claims, 6 Drawing Sheets

U.S. PATENT DOCUMENTS

| | | | | |
|---|---|---|---|---|
| 5,830,065 A | * | 11/1998 | Sitrick | 463/31 X |
| 5,863,248 A | * | 1/1999 | Mine et al. | 463/4 X |
| 5,880,709 A | * | 3/1999 | Itai et al. | 345/113 X |
| 5,935,003 A | * | 8/1999 | Stephens et al. | 463/31 X |
| 5,947,823 A | * | 9/1999 | Nimura | 463/32 X |
| 5,977,968 A | * | 11/1999 | Le Blanc | 345/339 X |

OTHER PUBLICATIONS

Barak Engel: "World Wide Soccer" ONLINE!, Sep. 1997 (1997–09), pp. 1–7, XP002130214 Retrieved from the Internet: <URL:www.gamesdomain.com/gdreview/zones/reviews/pc/sep97/wws.html> retrieved on 2000-02-09! *p. 3, paragraph 3*.

Patent Abstracts of Japan, vol. 018, No. 495 (c–1250), Sep. 16, 1994 & JP 06 165876 A (SEGA Enterp Ltd), Jun. 14, 1994.

*abstract* & JP 06 165876 A (SEGA Enterp Ltd) Jun. 14, 1994 * figure 3 *.

Patent Abstracts of Japan, vol. 1996, No. 05, May 31, 1996 & JP 08 024441 A (Namco Ltd), Jan. 30, 1996.

*abstract * & JP 08 024441 A (Namco Ltd) Jan. 30, 1996 * figure 6 *.

* cited by examiner

VIDEO GAME SYSTEM USING RADAR PICTURE

BACKGROUND OF THE INVENTION

1. Field of the Invention:

The present invention relates a game system which uses a computer to virtually play games, such as ball games, on a video picture displayed on a screen, with responding to commands supplied from an operator.

2. Description of the Related Art

There has been known a game system which can perform a virtual soccer or other ball game based on images displayed on a video screen. In order to give the displayed image powerfulness and the feeling of being at a live performance, a three-dimensional image is used to represent situations of the play within a limited area centering on the soccer ball, not the entire field where the soccer game is performed.

It is impossible, however, to grasp the locations of all player characters within the whole field by viewing images displaying only the limited area. In addition, deciding strategies, such as passing the ball, is difficult. In order to overcome such difficulties, recent game systems performing the soccer game is designed such that a radar picture (image) is superimposed on a part of the game play picture (image). The radar picture displays a reduced-size image of the entire field, wherein dots corresponding to all players are shown with different colors assigned to two teams confronting each other.

However, the above radar picture constantly displays the entire field regardless of the changes of the game playing situations in the course of the game. Thus, in case that the player characters gather in certain areas of the field in particular occasions, typically, in a battle in a frontal area of a goal or corner kicks in a soccer game, it is difficult to distinguish the players from one another. This leads to such a drawback that the operator cannot quickly recognize the game situations from the displayed images.

SUMMARY OF THE INVENTION

Accordingly, it is an object of the present invention to provide a video game system and a storage medium used in the video game system, which enable an operator to obtain appropriate information about the situations of a game from a radar picture timely and steadily.

According to one aspect of the present invention, there is provide a video game system used by an operator to perform a virtual play in which player characters on a virtual field are divided into two teams that compete to handle a ball and to carry the ball into a rival-team goal, the system including: a game progress control unit for repeatedly obtaining instructions inputted by the operator and for sequentially changing a game playing situation of the player characters by repeating calculation necessary for specifying the game playing situation based on the instructions; and a display control unit for displaying, based on a calculated result by the game progress control unit, a play image representing the game playing situation in a restricted area centered on a position of the ball in the field and a radar image representing positions of the player characters in a range of the field wider than a range represented by the play image in a manner reduced by a scale-down rate, wherein the display control unit includes a unit for changing the range represented by the radar image and the scale-down rate of the radar image on the basis of the game playing situation.

In accordance with the above configuration, the range displayed by the radar image and its scale-down rate are changed dependently upon the game playing situation. Hence the radar image can provide appropriate information about the game in the course of the game progress. For example, if the player characters gather into a certain area of the field, the displayed range by the radar image is focused on the certain area and its scale-down rate is decreased. This makes it possible to identify each player character and grasp the positions of the player characters. On the other hand, if the player characters are scattered all over the field, the entire field can be displayed in the radar image at larger scale-down rates, enabling the operator to grasp the situation of the game with a broader view.

In an embodiment, the game playing situation may include at least one of the position of the ball, the positions of the player characters, a behavior of the playing character handling the ball and information identifying the team to which each player character belongs.

The display control unit may include a unit for narrowing the range represented by the radar image and decreasing the scale-down rate when the team in offense carries the ball into a near-goal area set around the rival-team goal in the field. As a result, when the offence team carries the ball near the rival-team goal, the radar image is controlled to minutely display the positions of the player characters near the goal. The operator can therefore recognize the detailed situation near the rival-team goal in a steady fashion.

Further, the display control unit may include a unit for widening the range represented by the radar image and increasing the scale-down rate when the team in offense and the team in defense are turned over after the team in offense carries the ball into the near-goal area of the rival-team field. By this, when the team in defense takes the ball from the rival-team near the goal and starts a counter attack, the radar image displays the positions of player characters with a wider range. The operator can consider the successful strategy from the broader viewpoint with reference to the radar image.

The display control unit may include a unit for displaying the radar image at an area opposite to the rival-team goal displayed in the play image when the team in offense carries the ball into the near-goal area. By this, the radar image is displayed at an area opposite to the goal, upon which the operator's eyes are turned intensively. Thus the radar image does not become an obstacle to the play image.

The display control unit may include a unit for enlarging the radar image When it narrows the range represented by the radar image. If the ball is carried to a position near the goal, the radar image is displayed with its enlarged size. Thus, in association with focusing of a displayed range by the radar image and its lowered scale-down rate, the game playing situation near the goal is displayed minutely.

The display control unit may include a switching delay unit for holding the narrowed range represented by the radar image and the decreased scale-down rate of the radar image until a predetermined situation is satisfied, even if the ball is returned to outside of the near-goal area after the team in offense carries the ball into the near-goal area. Therefore, in cases where the team in offense handles the ball around the border of the predetermined area near the rival-team goal, even if the ball is put in the near-goal area once, then returned to outside the near-goal area, the narrowed displayed range by the radar image and the decreased scale-down rate thereof are maintained until the predetermined situation is satisfied.

This prevents the frequent radar image switching. The predetermined condition may be satisfied when a predetermined time period has passed after the ball is returned to outside of the near-goal area.

In a preferred embodiment, the virtual play may be a soccer, and the display control unit may include a unit for displaying the play image in which a lateral direction thereof agrees with a goal line direction and for displaying the radar image for a corner kick in which positions of the player characters in a restricted area in front of the rival-team goal are represented with the same display direction as the play image when the corner kick is performed. By this configuration, a situation in which the ball enters from a corner post to the frontal area of the goal is displayed in detail. In agreement with this display, behaviors of many player characters gathering in the frontal area of the goal are steadily and precisely displayed by the radar image.

The display unit may display the radar image in a manner superimposed on the play image. In addition, the game playing situation may include the position of the ball, and the display control unit may control the display unit to display a first type radar image when the position of the ball is in a near goal area, defined from a goal line, in the rival-team field and displays a second type radar image when the position of the ball is out of the near-goal areas of the rival-team field and the operator's team field, the first type radar image representing the positions of the player characters within a partial area on the field including the rival-team goal, the second type radar image representing the positions of the all player characters within the entire field. By this, the area near the goal is displayed in an enlarged manner by the first type radar image if the team in offense is attacking the rival-team goal. Otherwise, the entire field is shown by the second type radar image to enable the operator to grasp the whole game playing situation.

Further, the first type radar image may be represented at a position on the play image on an opposite side of a position where the rival-team goal is represented in the play image, thereby avoiding the interference of the player characters near the goal by the superimposition of the radar image. The size of the first type radar image on the play image may be larger than the size of the second type radar image.

In a preferred embodiment, the near-goal area includes a rectangular area having a longer side which is the goal line of the field and a shorter side of variable length. Further, the display control unit may extend the length of the shorter side when the team in offense carries the ball into the near-goal area in the rival-team field. By this, the frequent switching of the first and the second type radar images may be avoided.

According to another aspect of the present invention, there is provided a storage medium readable by a computer and into which a program of a video game is recorded, the video game is used by an operator to perform a virtual play in which player characters on a virtual field are divided into two teams that compete to handle a ball and to carry the ball into a rival-team goal, the program executing the steps of: sequentially changing a game playing situation by repeating calculation necessary for specifying the situation with reference to instructions given from the operator; displaying, based on a calculation result by changing step, a play image representing the game playing situation within a restricted area centered on a position of the ball on the field and a radar image representing positions of the player characters in a range wider than a range represented by the play image; and switching the range represented by the radar image and a scale-down rate of the radar image on the basis of the game playing situation.

By making a computer read the program recorded in the above storage medium, it is possible for the video game system to achieve the aforementioned object of the present invention.

In the present invention, the ball is not confined to a sphere-like object like a soccer ball or basketball, and it may include a deformed sphere-like object like a rugby ball, or a non-sphere object like a pack used in an ice hockey game. On one hand, the storage medium may include a variety of types of media into which program data are recordable, for example, an optical or magnet-optical recording medium such as a CD-ROM or DVD-ROM, a magnetic recording medium such as a hard disk or floppy disk, or a semiconductor memory device such as a RAM or ROM.

DESCRIPTION OF THE PREFERRED EMBODIMENTS

Referring to the accompanying drawings, a preferred embodiment of the present invention will be described.

Figure 1:
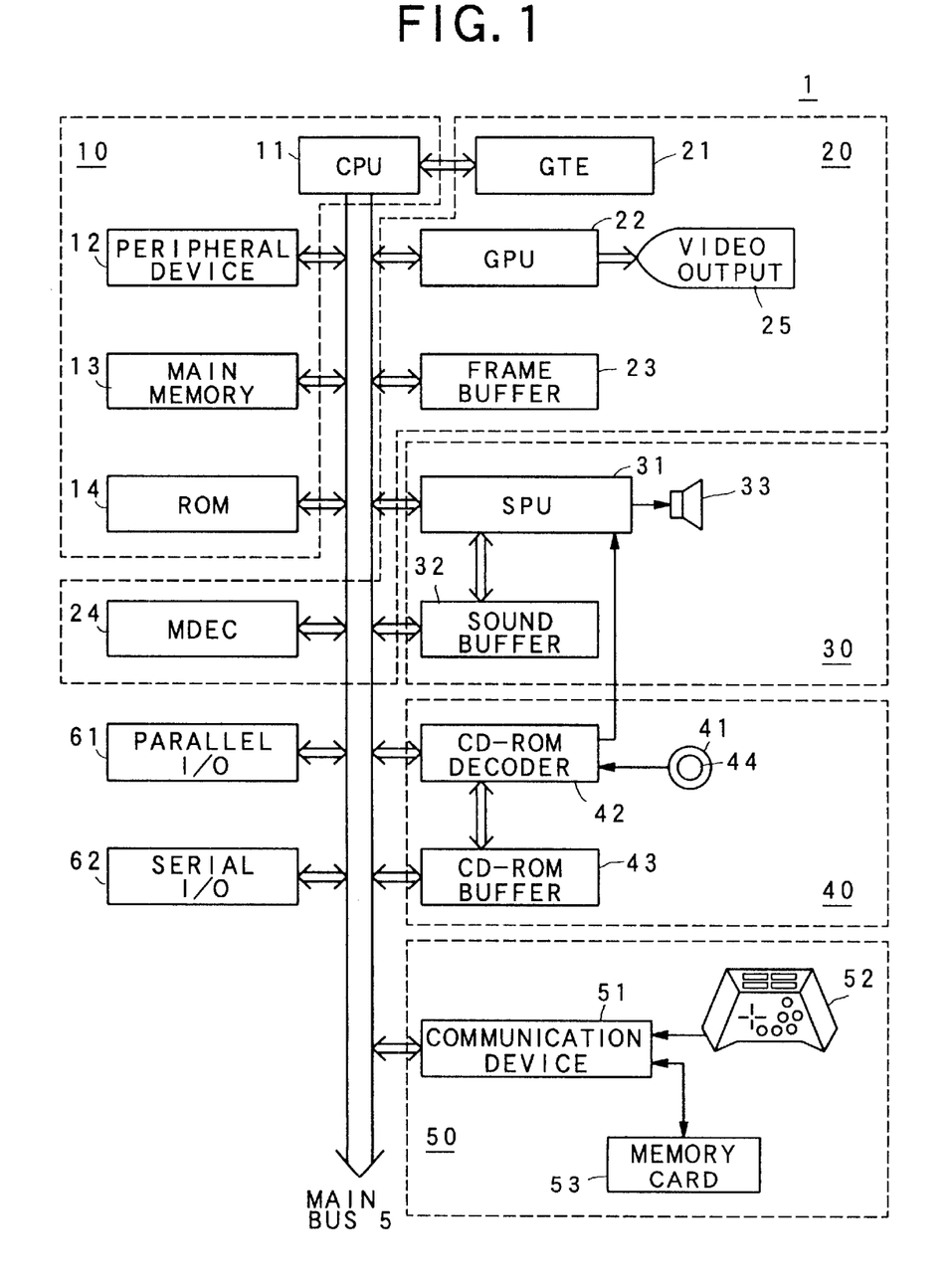
FIG. 1 is a block diagram of a game system according to an embodiment of the present invention.

FIG. 1 shows an embodiment in which the present invention is applied to a home-use game system. The game system 1 has a main controller module 10, a graphic controller module 20, a sound controller module 30, a disk controller module 40, and a communication controller module 50, all of which are connected with each other via a main bus 5. The main controller module 10 is provided with a CPU 11, a peripheral device 12, a main memory 13, and a ROM 14. The CPU 11, which main configuration may be a microprocessor, executes calculation necessary for the progress of a game as well as the control of each unit. The peripheral device 12 executes auxiliary control including interruption control to the CPU 11 and management of memory access. The main memory 13 is made up of rewritable semiconductor storage devices, such as a RAM. The ROM 14 is used for storing program data to control the basic operation of the game system 1.

The graphic controller module 20 is provided with a geometric transfer engine (GTE) 21 serving as a coprocessor, a graphics processing unit (GPU) 22, a frame buffer 23, and an image decoder (MDEC) 24. The GTE 21 performs predetermined kinds of calculation required to depict images (for example, calculation of coordinates of polygons used to depict three-dimensional images) in response to a command coming from the CPU 11. The GPU 22 is in charge of given depiction processing carried out responsively to a command from the CPU 11. The frame buffer 23 serves as a means for temporarily memorizing data depicted by the GPU 22. The MDEC 24 decodes compressed data of images, which are stored by the main memory 13. In the progress of a game, image data recorded in a CD-ROM 44 employed as a storage medium are loaded into the main memory 13 as required, decoded by the MDEC 24, and stored into the frame buffer 23 by the operation of the GPU 22. Data corresponding to an arbitrary area of the frame image stored in the frame buffer 23 are displayed by a monitor 25 (for example, a CRT of a home-use TV set) functioning as display means.

The sound controller module 30 has a sound processing unit (SPU) 31 which generates sound data, such as sound effect for game or BGM in response to a command generated from the CPU 11, a sound buffer 32 for temporarily storing the sound data processed by the SPU 31, and a speaker 33 for generating sounds in response to the sound data created by the SPU 31. In addition, the disk controller module 40 includes a CD-ROM drive 41, a CD-ROM decoder 42, and a CD-ROM buffer 43. The CD-ROM drive 41 rotatably drives a CD-ROM 44, during which time it optically reads program and data written therein. The CD-ROM decoder 42 decodes signals read by the CD-ROM drive 41 in accordance with predetermined procedures. The CD-ROM buffer 43 is used as a temporary memorizing means for storing data associated with the decoding by the decoder 42.

The communication controller module 50 includes a communication control device 51, a controller 52, and a memory card 53. The device 51 controls communication with the CPU 11 by way of the main bus 5. The controller 52 is an operation-inputting means having therein a plurality of operating members, such as push-button switches, operated by game player characters. The memory card 53, which serves as an auxiliary recording medium, is essentially constructed from rewritable and memory-sustainable semiconductor storage devices. Signals indicative of the operation states of the operating members of the controller 52 are outputted at predetermined intervals (for example, 60 times per second), and are sent to the CPU 11 through the communication control device 51. Although FIG. 1 shows only one set of the controller 52 and the memory card 53, plural sets of them can be connected with the communication control device 51. A variety of functions are assigned to the operating members of the controller 52 dependently upon the progress states of a game played and the set situation of the game.

Moreover, the game system has a parallel I/O (input/output) port 61 connectible with peripheral devices, and a serial I/O port 62 to which another game system can be coupled via communication cables (not shown). Connecting another game system via the serial 1/O port 62 allows two game systems 1 to be connected with other so that the operators can play game under the communication via the communication cable.

When the CD-ROM 44 carrying a program and data to execute a game according to the present invention is set into the disk controller module 40, a predetermined initialization processing (such as power-on and a not-shown reset switch operation) is completed and the CPU 11 starts the execution of a soccer game based on the program in the CD-ROM 44. The procedures of the game executed by the CPU 11 will now be described in detail.

Figure 2:
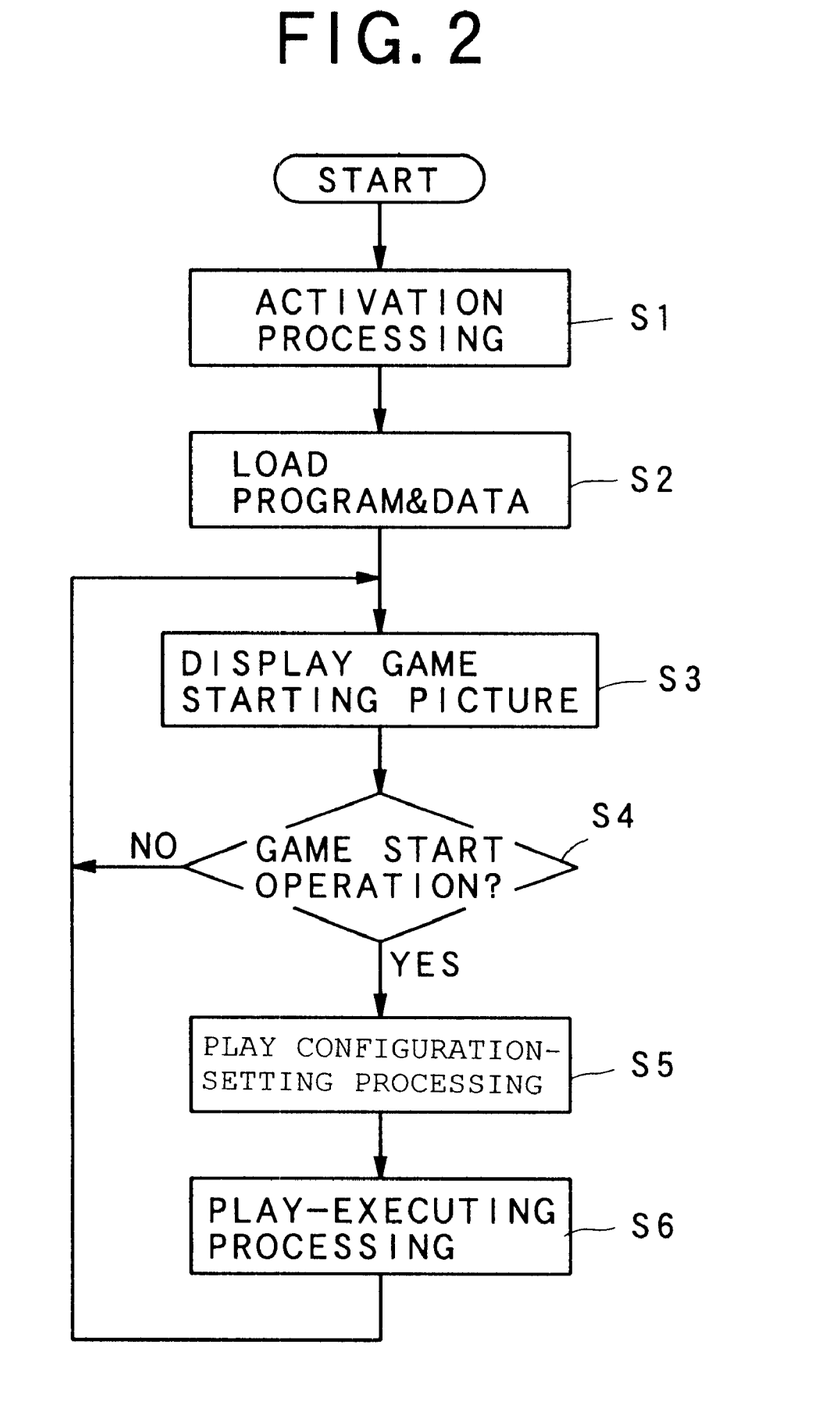
FIG. 2 shows a flowchart representing a main processing routine for a game executed by the CPU shown in FIG. 1.

FIG. 2 is a flowchart showing a main routine of a game program executed by the CPU 22. After the above initializing operation, given activation processing is executed on the basis of program stored in the ROM 14 (Step S1), and a program stored in the CD-ROM 44 and data necessary for the execution thereof are loaded into specified areas of the main memory 13 (Step S2). According to the loaded program and data, a predetermined game starting picture is displayed on the monitor 25 (Step S3). The game starting picture is made up of still image, animation images, and/or the appropriately-combined images which indicate messages and/or game characters, for example, inviting the operator to start playing game.

The game starting picture is displayed until the game operator performs a given game start operation with the controller 52 (Step S4). As soon as the start operation is made, a given play-configuration setting processing is performed with the operator observing the monitor 25 and operating the controller 52 (Step S5). Through the play-configuration setting operation, the operator sets the configuration of members of her or his team, a rival team, and other game environments. In this setting, there are provided two play modes; one mode is prepared for a situation where one team is managed by the operator and the other team by the CPU 11, and the other mode where two operators are confronted and compete with each other utilizing two sets of controllers 52.

Figure 3:
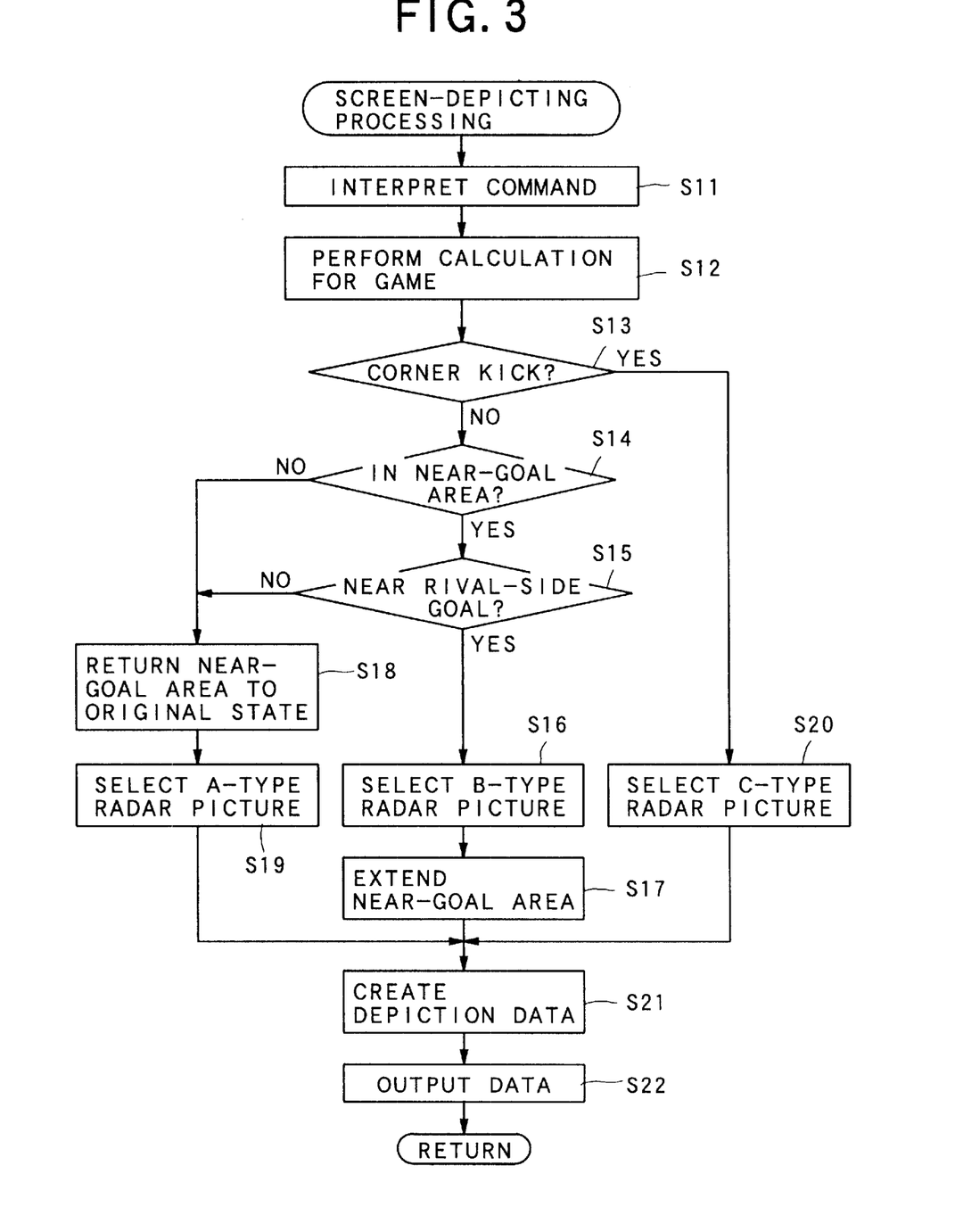
FIG. 3 is a flowchart representing a series of procedures for picture depiction processing repeated during the soccer game executed by the CPU.

When the game-configuration setting is completed and the operator performs a given game start operation toward the controller 52, play-executing processing is started (Step S6). The play-executing processing is provided to perform a virtual soccer game, in which the CPU 11 makes reference to various instructions (for example, instructions about movement of player characters and actions such as passes and shoots) supplied by the operator via the controller 52, and changes the positions of a soccer ball and the actions of the player characters at a given interval in response to the reference results. During the game execution, the CPU 11 repeats necessary calculation for the game progress at a predetermined intervals (for example, every $\frac{1}{30}$ sec.) so that data displayed as game playing pictures on the monitor 25 are reloaded based on each calculated result. The procedure of the image depiction over one cycle of this reloading is shown in FIG. 3, and examples of game playing images resultant from the procedure and displayed on the monitor 25 are shown in FIGS. 4 to 7, respectively.

Next, with reference to FIGS. 4 to 7, the game playing picture 100 will be described in a schematic fashion. Each game playing picture 100 includes a play picture 101 and a radar picture 110 partially superimposed on the play picture 101. The play picture 101 shows, as a three-dimensional image, a ball B and soccer player characters P within a limited area around the ball B. The range displayed by the play picture 101 is confined to part of an field for soccer, so the operator can not grasp the game situation in the entire field from the play picture 101.

In playing game, the operator selects and operates only one character among all of the soccer player characters of the operator's team through the controller 52 and the remaining soccer player characters are operated by the CPU 11 based on a given algorithm. The play picture 101 displays one or more markers 102 indicating selected soccer player to be operated. In case that two-operators mode is selected, a marker 102 is displayed for each operator, as shown in FIGS. 4 to 7. At the lower area of the play picture 101, player character information displaying areas 103 and 103 are set, which display various pieces of information about the player character, such as player character's name and position, specified by the markers 102 and 102. At the upper positions of the play picture 101, there is provided a score area 104 for displaying the scores of both the teams and a clock area 105 for displaying the elapsed time (or remaining time) of the game.

On one hand, the radar picture 110 is a two-dimensional image made by reducing the field entirely or partially, wherein the positions of the player characters and the ball are indicated by corresponding dots 112, . . . , 112 and 113. The dots are colored differently in dependence upon whether each dot represents the operator's team's player character or a rival team's player character. This embodiment provides three types of radar pictures 110. The first type is an A-type radar picture superimposed at a bottom center position of the play picture 101 (refer to FIGS. 4 and 6), the second one is a B-type radar picture superimposed at a right or left edge-side position of the play picture 101 (refer to FIG. 5), and the third one is a C-type radar picture superimposed at a top center position of the display picture 101 (refer to FIG. 7). In the following description, the radar picture 110 is noted in the form of the reference plus subscripts like 110A, 110B, or 110C, provided its type is required to be distinguished; otherwise it is noted simply as 110, without subscripts.

The A-type radar picture 110A is provided for the purpose of being used in grasping the field entirely and designed so as to reduce and display the entire field. On the contrary, the B-type radar picture 110B is designed for the use to grasp detailed situations in a frontal area of the goal. To achieve this, the B-type radar picture 110B is smaller in a scale-down rate of the field than the A-type radar picture 110A and a displayed range by the B-type radar picture 110B is restricted to a certain area in front of the goal. However, it is always kept that the displayed range by the B-type radar picture 110B is set to be wider than the range displayed by the play picture 101. For example, in FIG. 5, the play picture 101 displays only a limited right corner area (when viewing toward the goal) in front of the goal, but the B-type radar picture 110B includes the corner areas of both sides in front of the goal. Additionally, the B-type radar picture 110B is larger in size than the A-type radar picture 110A, allowing situations in the area in front of the goal to be recognized more easily.

Figure 4:
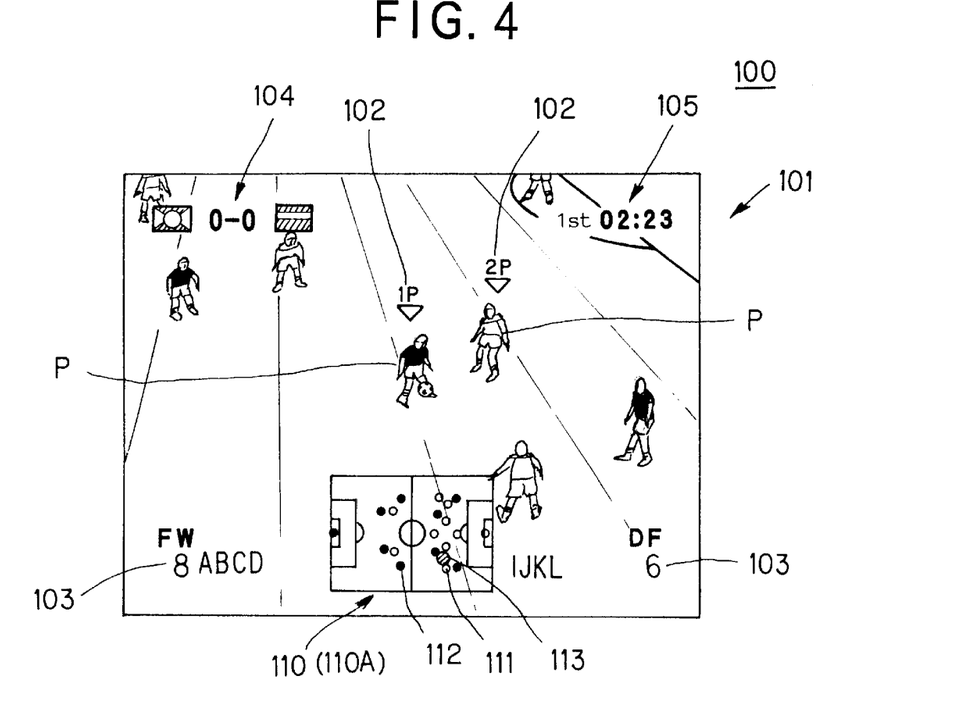
FIG. 4 is one illustration of a game playing picture displayed as a result of processing based on FIG. 3.
Figure 5:
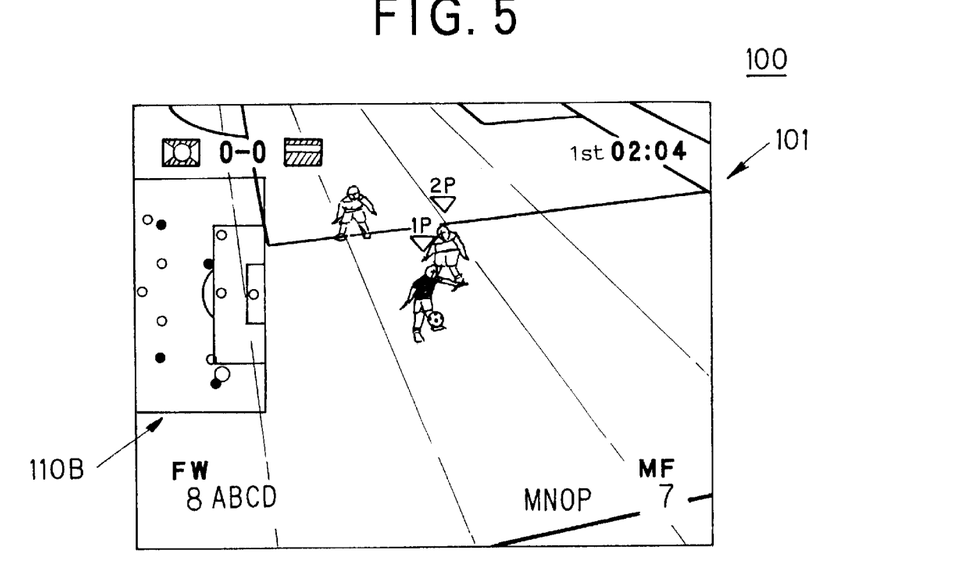
FIG. 5 is another illustration of the game playing picture displayed as a result of processing based on FIG. 3 and shows a battle in an area in front of a goal.
Figure 6:
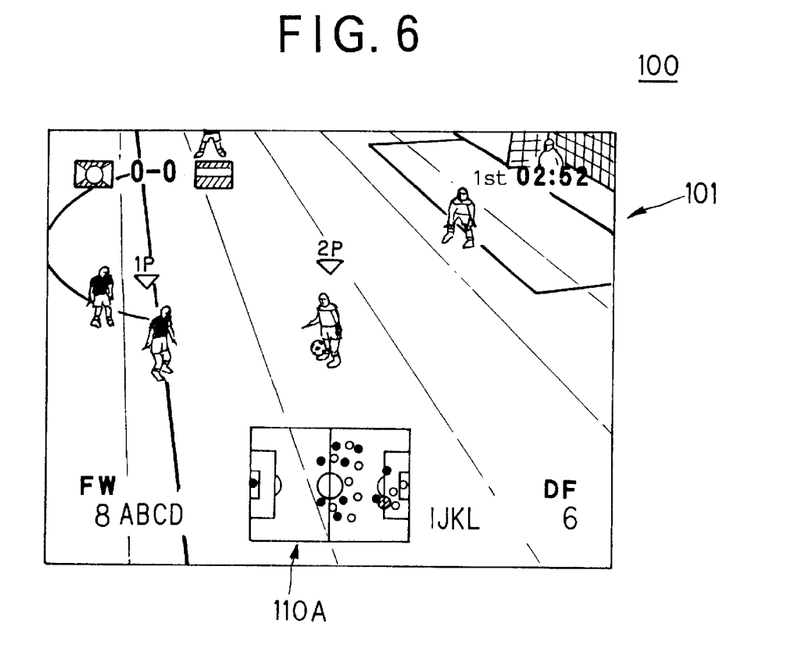
FIG. 6 is another illustration of the game playing picture displayed as a result of processing based on FIG. 3 and shows a situation where the battle in the area in front of the goal ended and offense is going to attack toward the opposite side goal.

The C-type radar picture 110C is prepared to dedicatedly show corner kick situation. Thus, as shown in FIGS. 4 to 6, while in the normal play other than the corner kicks, the play picture 101 is displayed in such a state that the lateral (right-left) direction thereof is in agreement with the longitudinal direction (i.e., touchline direction) of the field. In the corner kick situation, the play picture 101 is displayed in the state that the longitudinal direction thereof is made to agree with the short-side direction (i.e., goal line direction) of the field in order to show in detail how the ball is carried into the goal area. In accordance with the direction thus set, the C-type radar picture 110C is displayed such that its lateral direction agrees with the goal line direction, differently in direction from the A-type and B-type radar pictures 110A and 110B. The displayed range and scale-down rate of the C-type radar picture 110C are equal to those of the B-type radar picture 110C.

The B-type radar picture 110B is displayed at the left-end side in the play picture 101 when one team is on the offence toward the right-end side therein, whereas it is displayed at the right-end side in the play picture 101 when one team is on the offence toward the left-end side therein. Namely the B-type radar picture 110B is always displayed at the opposite side to an offence direction. In this respect, the C-type radar picture 110C is also based on the same manner. For a battle in offence and defense performed in front of the goal, the player character's view point concentrates on an area around the goal. Thus, since the B-type or C-type radar picture is displayed at a position opposite to the goal, the radar picture rarely becomes an obstacle in showing the behavior of the player characters even if it is enlarged in size.

The type of picture among the radar pictures 110A to 110C is used is determined through the procedure shown in FIG. 3. The processing is a subroutine executed during the play done under control of the play-executing processing shown at Step S6 of FIG. 2, which is repeated at every picture updating timings. At the first Step S11, commands inputted into the controller 52 in an interval from the last picture updating to the current time are interpreted. With referring to the commands, various kinds of calculation necessary for determining present situations of the soccer play are performed (Step S12). In this step, the positions of both the ball and the player characters are obtained.

Figure 8:
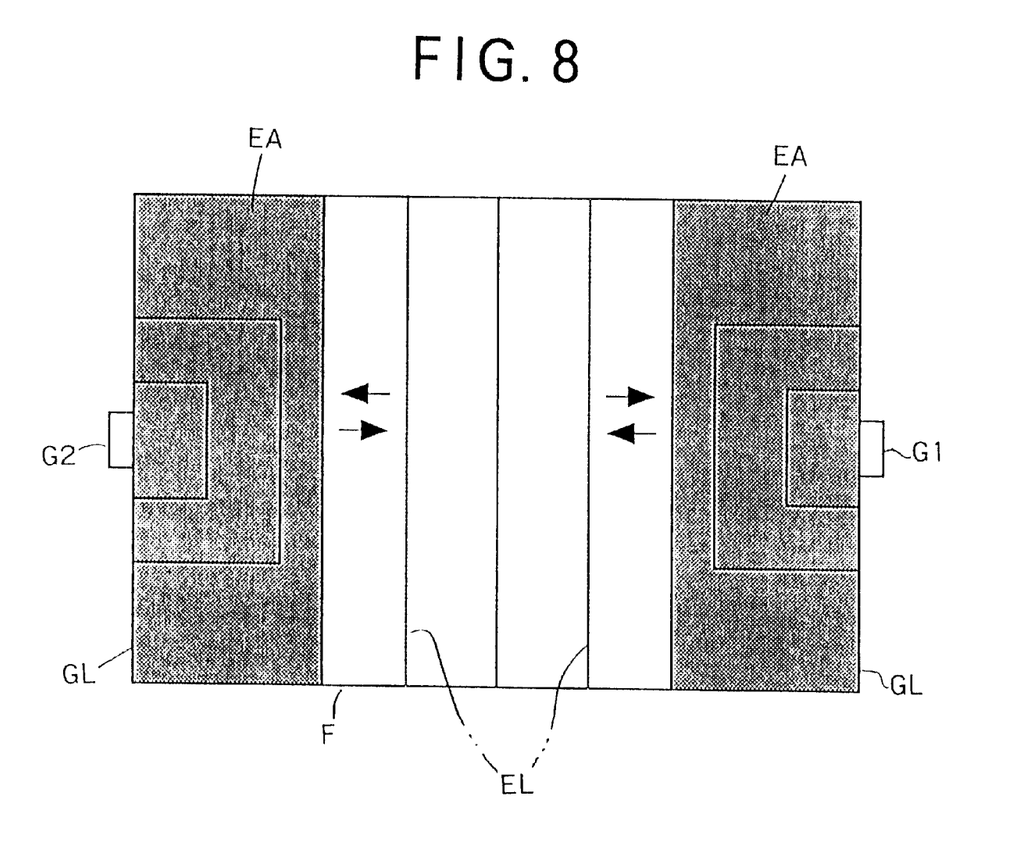
FIG. 8 shows a relationship between the soccer field and a near-goal area used for switching the radar picture.

Then, using the game situations thus determined, it is determined whether a corner kick is now being performed or not (Step S13). If the determination is negative (i.e., corner kick is not being performed), it is further determined if the ball B is positioned within predetermined radar-enlarging areas (also referred to as "near-goal area") EA or not (Step S14). As shown in FIG. 8, each near-goal area EA is set as a given area extending by a given length from each goal line GL and set to both the goal lines GL.

When the ball B exists within the near-goal areas EA, the determination at Step S14 is affirmative, and the processing goes to a determination whether or not the battle is performed within a rival-team field (Step S15). For example, in FIG. 8, in the case that a player character in offence rushing toward the right-side goal G1 holds the ball B, if the ball has been carried into the near-goal area EA in front of the goal G1, the determination is that the battle is in the rival-team field. In contrast, if the ball B resides in the near-goal area EA in front of the goal G2 of the player character's side field, the determination is that the baffle is performed outside the rival-team field. Additionally, when the ball B is in the near-goal areas EA, but it is impossible to determine which team's player character handles the ball, the determination is done by returning to a previous ball-holding state. That is, once it was determined that the battle was in the rival-team field, the determination at Step S15 is kept being affirmative until the defensive side player characters take the ball back and the offence side and the defense side are turned over.

When it is determined that the battle is in the rival-team field, the B-type radar picture 110B is selected (Step S16), and then the near-goal areas EA are extended in size than they have been so far (Step S17). For example, as shown by two lines EL in FIG. 8, the areas EA on both sides are expanded by a given quantity toward the center line CL, respectively. If the extension has already been completed, the extended state is kept as it is and no further extension is made.

In contrast, if it is determined that the ball B is not in the areas EA, the size of the areas EA are returned to their original states before the extension at Step S17 (Step S18), and then the A-type radar picture 110A is selected (Step S19). Similarly, when the determination at Step S15 is negative, the processing proceeds to Step S19. When it is determined at Step S13 that a corner kick is being performed, the C-type radar picture 110C is selected (Step S20).

After the processing at Step S17, S19, or S20, data to depict the next pictures is created using the calculated result at Step S12 as well as the selection result to show which picture among the three radar picture 110A to 110C should be used (Step S21). The created data are sent to the graphic controller module 20 (Step S22). Thus, one cycle of the picture depiction processing is completed.

According to the above described processing, the determination at Step S14 is negative when the offensive player characters (player characters keeping the ball) handle the ball B outside the areas EA, resulting in the selection of the A-type radar picture 110A (refer to FIG. 4). If the ball B is carried into the area EA in front of the rival-team goal because of the progress of the offence, the determination is affirmative at both the Step S14 and S15, resulting in the selection of the B-type radar picture 110B (refer to FIG. 5).

Once the B-type radar picture 110B was selected, the near-goal areas EA themselves are extended. After this, the affirmative determination at Step S14 is kept as long as the ball B is not returned to backward positions out of the area EA in the rival-team field. Thereafter, unless the defensive player characters take the ball B back, the determination at Step S15 is kept affirmative, continuing the selection of the B-mode radar picture 110B. This determination method eliminates the possibility that the radar pictures may be switched over frequently when the ball B is handled on or around the borders of the areas EA set before extension.

Figure 7:
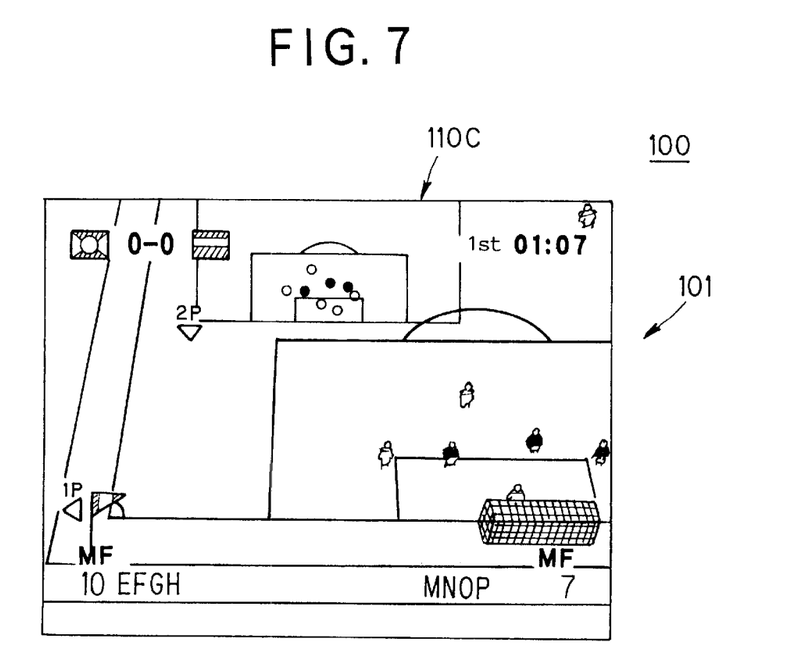
FIG. 7 is another illustration of the game playing picture displayed as a result of processing based on FIG. 3 and shows the state of a corner kick.

When the offensive player characters returns the ball B to a backward position out of the area EA in the rival-team field, or the defensive player characters take back the ball B and the offence and the defense are turned over, the negative determination is made at Step S14 or S15 to switch the picture to the A-type radar picture 110A (refer to FIG. 6). At this time, the near-goal areas EA are returned to their original size set before its extension. Thus, the A-type radar picture 110A is kept being used after the switching thereto as long as the offence makes progress to the original near-goal area EA in one-side field.

Where a corner kick is performed, the C-type radar picture 110C is displayed (refer to FIG. 7). Additionally, when it has ended, either one of the A-type or B-type radar picture 110A or 110B is selected dependently upon the ball position and the relationship between the offence and the defense obtained at the time when the corner kick ends.

The present invention is not limited to the feature of the above embodiment, and can be practiced into a wide range of variations. By way of example, the number of types of the radar picture 110 is not limited three as described above, but two types, or four or more types may be adopted. By way of example, the displayed range provided by the radar picture 110 can be changed continuously according to various positions of the ball B. In place of the technique to prevent frequent switching between the radar pictures 110A and 110B by extending the near-goal areas EA, another technique can be adopted wherein switching of the radar pictures is prohibited for a certain interval after the radar pictures have been switched. The game system according to the present invention is not limited to application to the soccer game, and alternatively, it can be applied to various ball games or games approximately referred to as ball games including a rugby game and an ice hockey game, for example.

As describe above, in the present embodiments, the displayed range and scale-down rate of the radar picture are switched in conformity with situations of a game developed in a virtual field. Hence, in scenes where player characters tend to concentrate in specified areas in the field, the displayed range of the radar picture is focused on the specified areas and the scale-down rate is reduced. This makes it possible to recognize in detail the player character's distinctions and the positions thereof. In contrast, in scenes where the player characters are relatively scattered, the entire field is displayed at a larger scale-down rate to enable the recognition of the game situation from a broader view. Regardless of the game situations, this always provides appropriate information for the radar picture.

Numerous other modifications and variations of the present invention will be apparent to those skilled in the art in view of the foregoing description. Thus, it is to be understood that, within the scope of the appended claims, the present invention may be practiced other than as specifically described hereinabove.

What we claim is:

1. A video game system by which an operator plays a game wherein teams including a player's team and a rival team have characters respectively including player characters and rival characters that compete, the operator playing using the player characters of the player's team on a virtual field that compete against the rival characters of the rival team to move a game object into a goal of an opposing one of said teams, the system comprising:

an input device permitting the operator to input instructions;

game progress control means for repeatedly obtaining the instructions inputted by the operator and for sequentially changing a game playing situation of the player characters by repeating calculations to produce a calculated result determining the game playing situation based on the instructions;

display control means for displaying on a display, based on the calculated result, the following:

a play image representing the game playing situation within a restricted area smaller in size than the virtual field and centered on a position of the game object on the virtual field; and a radar image representing positions of the player characters in a range of the virtual field wider than a range represented by the play image in a manner reduced by a scale-down rate; and the display control means including means for changing the range represented by the radar image between portions of the virtual field having differing sizes and locations and changing the scale-down rate of the radar image based on the game playing situation.

2. The system according to claim 1, wherein the game playing situation includes at least one of the position of the game object, positions of the player characters, a behavior of one of the characters handling the game object and information identifying whether said one of the characters belongs to the player's team or the rival team.

3. The system according to claim 1, wherein the display control means comprises means for narrowing the range represented by the radar image to a narrowed range and decreasing the scale-down rate of the radar image to a decreased scale-down rate when an offensive team of the teams carries the game object into a near-goal area around the goal of a defensive team of the teams.

4. The system according to claim 3, wherein the display control means comprises means for widening the range represented by the radar image and increasing the scale-down rate when the offensive team and the defensive team exchange offensive and defensive roles after the offensive team carries the game object into the near-goal area of the defensive team.

5. The system according to claim 3, wherein the display control means comprises means for displaying the radar image at an area opposite to the goal of the rival team displayed in the play image when the player's team carries the game object into the near-goal area of the rival team.

6. The system according to claim 3, wherein the display control means comprises means for enlarging the radar image to an enlarged radar image when narrowing the range represented by the radar image.

7. The system according to claim 3, wherein the display control means includes switching delay means for maintaining the narrowed range represented by the radar image and the decreased scale-down rate of the radar image until a predetermined condition is satisfied when the game object is returned to outside of the near-goal area after the offensive team carries the game object into the near-goal area.

8. The system according to claim 7, wherein the predetermined condition is satisfied when a predetermined time period has passed after the game object is returned to outside of the near-goal area.

9. The system according to claim 1, wherein the game is a soccer game, and the display control means comprises means for displaying the play image with a lateral direction thereof substantially aligned with a goal line direction and for displaying the radar image with a the range limited to a restricted area for a corner kick with positions of the player characters shown in the restricted area in front of the goal and a lateral direction of the radar image substantially aligned with the lateral direction of the play image.

10. The system according to claim 1, wherein the radar image is superimposed on the play image.

11. The system according to claim 10, wherein:

the game playing situation includes the position of the game object;

the display control means controls the display to display the radar image as:
- a first type radar image when the position of the game object is in a near-goal area proximate a goal line of the goal of the rival team; and
- a second type radar image when the position of the game object is out of the near-goal area of the goal of the rival team;

the first type radar image represents the positions of the player characters within a partial area on the virtual field including the goal of the rival team; and the second type radar image represents the positions of the player characters over an entire area of the virtual field.

12. The system according to claim 11, wherein the first type radar image is represented at a position on the play image on an opposite side of a position where the goal of the rival team is represented in the play image.

13. The system according to claim 11, wherein a size of the first type radar image on the play image is larger than a size of the second type radar image.

14. The system according to claim 11, wherein the near-goal area comprises a rectangular area having a longer side which is the goal line of the virtual field and a shorter side of variable length.

15. The system according to claim 14, wherein the display control means extends the length of the shorter side when an offensive team of the teams carries the game object into the near-goal area of a defensive team of the teams.

16. The system according to claim 2, wherein the radar image is superimposed on the play image.

17. The system according to claim 2, wherein the radar image and the play image are simultaneously displayed.

18. The system according to claim 3, wherein the radar image is superimposed on the play image.

19. The system according to claim 3, wherein the radar image and the play image are simultaneously displayed.

20. The system according to claim 4, wherein the radar image is superimposed on the play image.

21. The system according to claim 4, wherein the radar image and the play image are simultaneously displayed.

22. The system according to claim 6, wherein the radar image is superimposed on the play image.

23. The system according to claim 6, wherein the radar image and the play image are simultaneously displayed.

24. The system according to claim 7, wherein the radar image is superimposed on the play image.

25. The system according to claim 7, wherein the radar image and the play image are simultaneously displayed.

26. The system according to claim 8, wherein the radar image is superimposed on the play image.

27. The system according to claim 8, wherein the radar image and the play image are simultaneously displayed.

28. The system according to claim 9, wherein the radar image is superimposed on the play image.

29. The system according to claim 9, wherein the radar image and the play image are simultaneously displayed.

30. The system according to claim 1, wherein the display control means decreases the scale-down rate from a first value for displaying an entirety of the virtual field on the radar display to a second value less than the first value and sets the range of the radar image to a first area, less than the entirety of the virtual field, when the player characters are concentrated to the first area, and displays the entirety of the virtual field with by setting the scale-down rate to said first value when the player characters are dispersed.

31. A storage medium readable by a computer and having an executable program of a video game is recorded, the video game allowing an operator plays a game wherein teams including a player's team and a rival team have characters respectively including player characters and rival characters that compete, the operator playing using player characters of a player's team on a virtual field that compete against the rival characters of a rival team to move a game object into a goal of an opposing one of said teams, the program executing the steps of:

sequentially changing a game playing situation of the player characters by repeating calculations necessary to produce a calculated result determining the game playing situation based on instructions from the operator;

displaying, based on the calculated result, the following:
- a play image representing the game playing situation within a restricted area smaller in size than the virtual field and centered on a position of the game object on the virtual field; and
- a radar image representing positions of the player characters in a range of the virtual field wider than a range represented by the play image; and switching the range represented by the radar image between portions of the virtual field having differing sizes and locations and switching a scale-down rate of the radar image based on the game playing situation.

32. The storage medium of claim 31 wherein the radar image is superimposed on the play image.

33. The storage medium of claim 31 wherein the radar image and the play image are simultaneously displayed.

34. The storage medium according to claim 31, wherein the scale-down rate is decreased from a first value for displaying an entirety of the virtual field on the radar display to a second value less than the first value and the range of the radar image is set to a first area, less than the entirety of the virtual field, when the player characters are concentrated to the first area, and the entirety of the virtual field is displayed with by setting the scale-down rate to said first value when the player characters are dispersed.

* * * * *